United States Patent
Goto et al.

(10) Patent No.: US 6,519,330 B2
(45) Date of Patent: Feb. 11, 2003

(54) TRAFFIC DATA COLLECTION TECHNIQUE

(75) Inventors: Kenta Goto, Tokyo (JP); Shinichi Sasamori, Aomori (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/772,947

(22) Filed: Jan. 31, 2001

(65) Prior Publication Data

US 2001/0010717 A1 Aug. 2, 2001

(30) Foreign Application Priority Data

Jan. 31, 2000 (JP) ......................................... 2000-021675

(51) Int. Cl.[7] ............................................. H04M 15/00
(52) U.S. Cl. .................... 379/133; 379/112.01; 379/111
(58) Field of Search ............................. 379/112.01, 133, 379/112.06, 112.07, 111, 134, 135, 136, 137, 138, 139, 140

(56) References Cited

U.S. PATENT DOCUMENTS

| | | | | | |
|---|---|---|---|---|---|
| 4,723,270 | A | * | 2/1988 | Okamoto et al. | 379/113 |
| 5,041,966 | A | * | 8/1991 | Nakai et al. | 379/112 |
| 5,258,979 | A | * | 11/1993 | Oomuro et al. | 379/112 |
| 5,410,589 | A | * | 4/1995 | Galligan | 379/134 |
| 5,949,862 | A | * | 9/1999 | Fukuzawa et al. | 379/113 |

* cited by examiner

*Primary Examiner*—Rexford Barnie
(74) *Attorney, Agent, or Firm*—McGinn & Gibb, PLLC

(57) ABSTRACT

A network management system allowing traffic data collection not to overload switching equipment is disclosed. A schedule table has a plurality of entries, in which traffic data collection events for respective ones of traffic counters are distributed at intervals. A traffic data collection processor sequentially accesses the entries of the schedule table and, when a traffic data collection event is registered in an accessed entry, a traffic data collection request is transmitted to a corresponding traffic counter.

21 Claims, 4 Drawing Sheets

FIG. 2

SCHEDULE TABLE 50

| SERIAL NO. | EVENT TYPE | PROCESSOR ID |
|---|---|---|
| 1 | TRAFFIC | 3.1 |
| 2 | | |
| 3 | | |
| 4 | | |
| 5 | | |
| 6 | TRAFFIC | 3.2 |
| 7 | | |
| 8 | | |
| 9 | | |
| 10 | | |

⋮

| 3596 | TRAFFIC | 3.720 |
|---|---|---|
| 3597 | | |
| 3598 | | |
| 3599 | | |
| 3600 | | |

TRAFFIC DATA COLLECTION TECHNIQUE

BACKGROUND OF THE INVENTION

1. Field of the Invention

The present invention relates to a network management system that manages switching equipment in a network, and in particular to a scheduling technique of traffic data collection from the switching equipment.

2. Description of the Related Art

A network management system performs maintenance and administration of a switched network, for example, monitoring failures in the switched network, changing the setting of a switch, and monitoring the traffic status of each switch.

In general, a switch is provided with a traffic detector or counter for each line port to measure the amount of traffic thereon and the network management system collects the traffic data measured for each line port from a switch at regular intervals.

However, in the case of a large-size electronic switching system, 1000 traffic counters are installed therein. If traffic data is concurrently read from all the 1000 traffic counters, then the switching system becomes overloaded, which may cause the line connection function notto normally work. For example, when the traffic data collection is performed, line connections cannot be made even when there are available lines, resulting in increased loss of call.

SUMMARY OF THE INVENTION

An object of the present invention is to provide a network management system and a traffic data collection method that perform traffic data collection so as not to overload switching equipment.

According to the present invention, a network management system having a function of collecting traffic data at predetermined intervals from a switch having a plurality of traffic detectors provided for respective ones of line ports of the switch, includes: a schedule table having a plurality of entries, in which traffic data collection events for respective ones of the traffic detectors are distributed at first predetermined intervals; a scheduler for creating the schedule table at second predetermined intervals; and a traffic data collection processor for sequentially accessing the plurality of entries of the schedule table to transmit traffic data collection requests to the traffic detectors depending on whether a traffic data collection event is registered in an accessed entry.

The entries in the schedule table may be associated with lapses of time in sequence, respectively. A number N of the entries in the schedule table may be determined by multiplying M by T, where M is a maximum permissible number of traffic data collection requests that the switch can cope with per unit of time, and T is a second predetermined interval. A first predetermined interval L may be determined by dividing N by K, where K is a number of the traffic detectors provided in the switch.

The traffic data collection events may be registered in equally spaced entries in the schedule table. At least one interrupt event other than the traffic data collection events may be registered in an available entry other than the equally spaced entries in the schedule table. The scheduler may delete said at least one interrupt event from the schedule table when all the entries of the schedule table have been accessed. Each of the equally spaced entries in the schedule table may store an event type of traffic data collection and an identification identifying a corresponding traffic detector.

According to another aspect of the present invention, a method for collecting traffic data at predetermined intervals from a switch having a plurality of traffic detectors provided for respective ones of line ports of the switch, includes the steps of: storing a plurality of entries in a schedule table, in which traffic data collection events for respective ones of the traffic detectors are distributed at first predetermined intervals; creating the schedule table at second predetermined intervals; and sequentially accessing the plurality of entries of the schedule table; and when a traffic data collection event is registered in an accessed entry, transmitting a traffic data collection request to a corresponding traffic detector.

According to still another aspect of the present invention, a network management system having a function of periodically collecting traffic data at predetermined intervals from a switch having a plurality of traffic counters provided for respective ones of line ports of the switch, includes: traffic counter processors provided for respective ones of the traffic counters, each of the traffic counter processors transmits a traffic data collection request to a designated one of the traffic counters and stores traffic data received from the designated traffic counter; a schedule table for scheduling operations of the traffic counter processors; a schedule table creation processor for providing a schedule time interval to each of the entries of the schedule table and assigning processor identifications of the traffic counter processors to entries equally spaced in the schedule table; a collection cycle timer for activating schedule table creation processing of the schedule table creation processor in a predetermined period of time; a schedule execution processor for activating the traffic counter processors depending on the processor identifications registered in the schedule table; and a schedule execution timer for activating the schedule execution processor in a predetermined period of time, wherein traffic counter collection requests are transmitted to the switch uniformly for a predetermined time period.

As described above, a predetermined number of traffic data collection requests are transmitted to the switch at predetermined intervals, which are equally spaced during a predetermined time period. Therefore, the load of traffic data collection on the switch is distributed, avoiding causing the switch to be overloaded. The distribution of traffic data collection requests is obtained by a schedule table containing a plurality of entries according to elapsed time, among which a plurality of events are distributed.

BRIEF DESCRIPTION OF THE DRAWINGS

FIG. 2 is a diagram showing an example of a schedule table used in the embodiment;

DESCRIPTION OF THE PREFERRED EMBODIMENT

Figure 1:
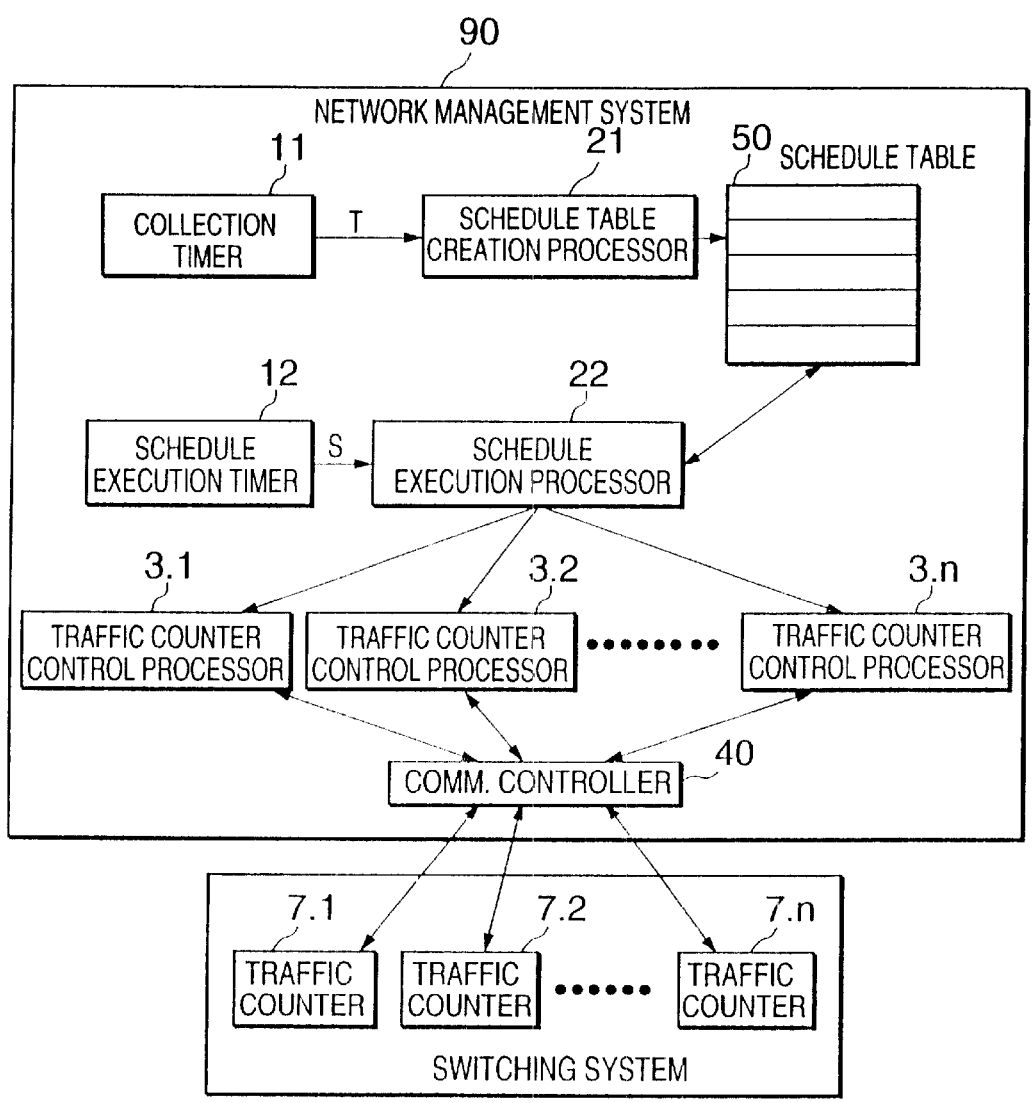
FIG. 1 is a block diagram showing the configuration of a network management system according to an embodiment of the present invention.

Referring to FIG. 1, switching equipment 60 is provided with n traffic counters 7.1 to 7.n for respective ones of line ports thereof. Each of the traffic counters 7.1 to 7.n counts traffic of a corresponding line port. The traffic data counter by each traffic counter is collected by a network management system 90 controlling the traffic data collection request to avoid causing the switching equipment 60 to be overloaded.

The network management system 90 is provided with traffic counter control processors 3.1 to 3.n corresponding to respective ones of the traffic counters 7.1 to 7.n of the switching equipment 60. Each of the traffic counter control processors 3.1 to 3.n can communicate with a corresponding traffic counter via a communication controller 40 under control of a schedule execution processor 22. As described later, a traffic counter control processor 3.1 designated by the schedule execution processor 22 transmits a traffic data collection request to a corresponding traffic counter 7.i and then receives and holds traffic data from the traffic counter 7.i.

The schedule execution processor 22 instructs a designated one of the traffic counter control processors 3.1 to 3.n to transmit a traffic data collection request by referring to a schedule table 50 according to a schedule execution timing signal S received from a schedule execution cycle timer 12. The schedule table 50 stores event schedule data that are created by a schedule table creation processor 21 according to a collection timing signal T received from a collection cycle timer 11. In other words, the traffic data collection from the traffic counters 7.1 to 7.n is performed at intervals of T determined by the collection cycle timer 11.

Schedule Table Creation

Referring to FIG. 2, the schedule table 50 has a format composed of a serial number field, an event type field, and a processor identification (ID) field. The serial number is associated with elapsed time. The event type indicates the type of an event such as traffic data collection, switch setting change, or other processing. The processor ID identifies a processor associated with the event type. There will be described in detail how to create the schedule table 50 hereafter.

Figure 3:
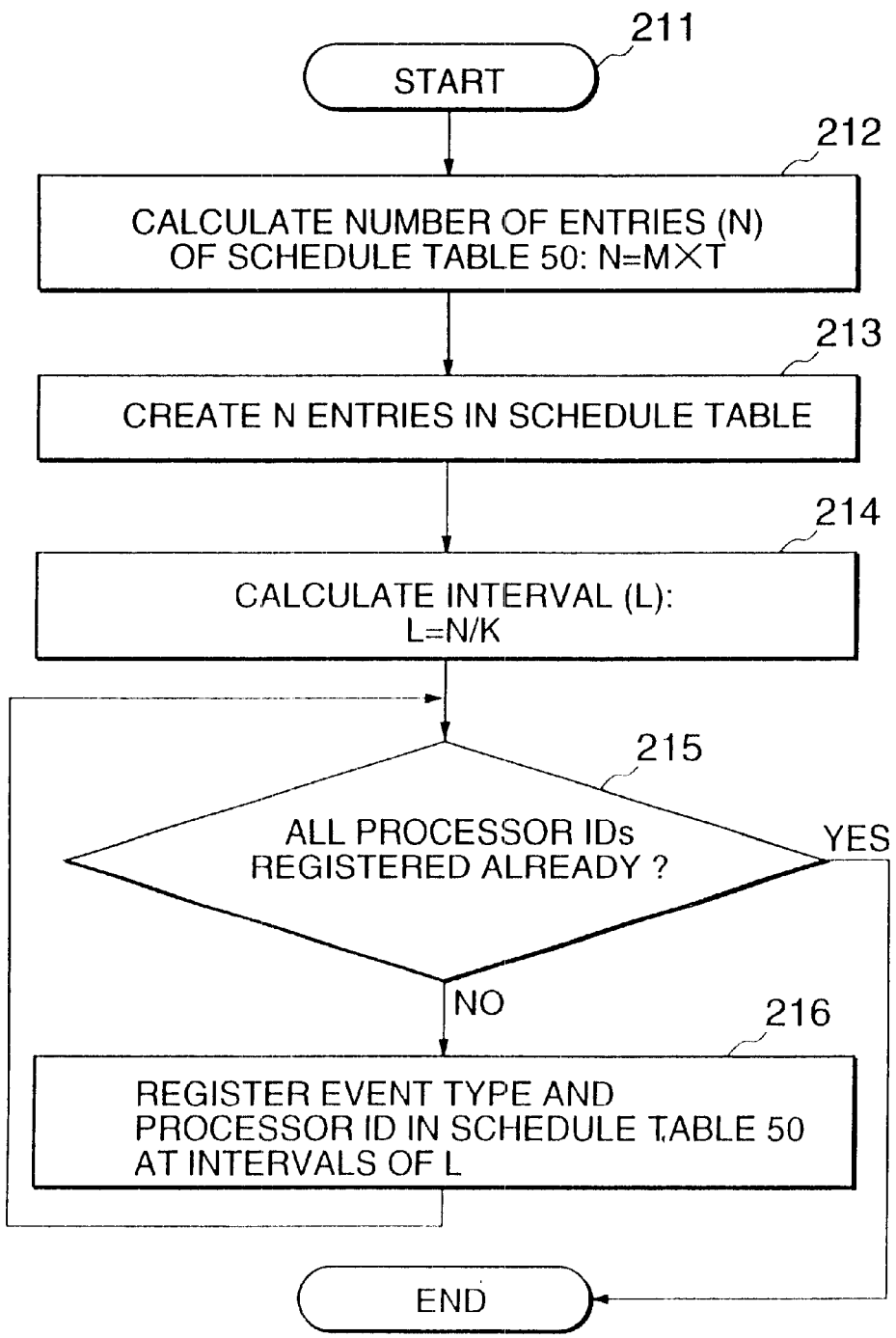
FIG. 3 is a flowchart showing an operation of a schedule table creation processor in the embodiment.
Figure 4:
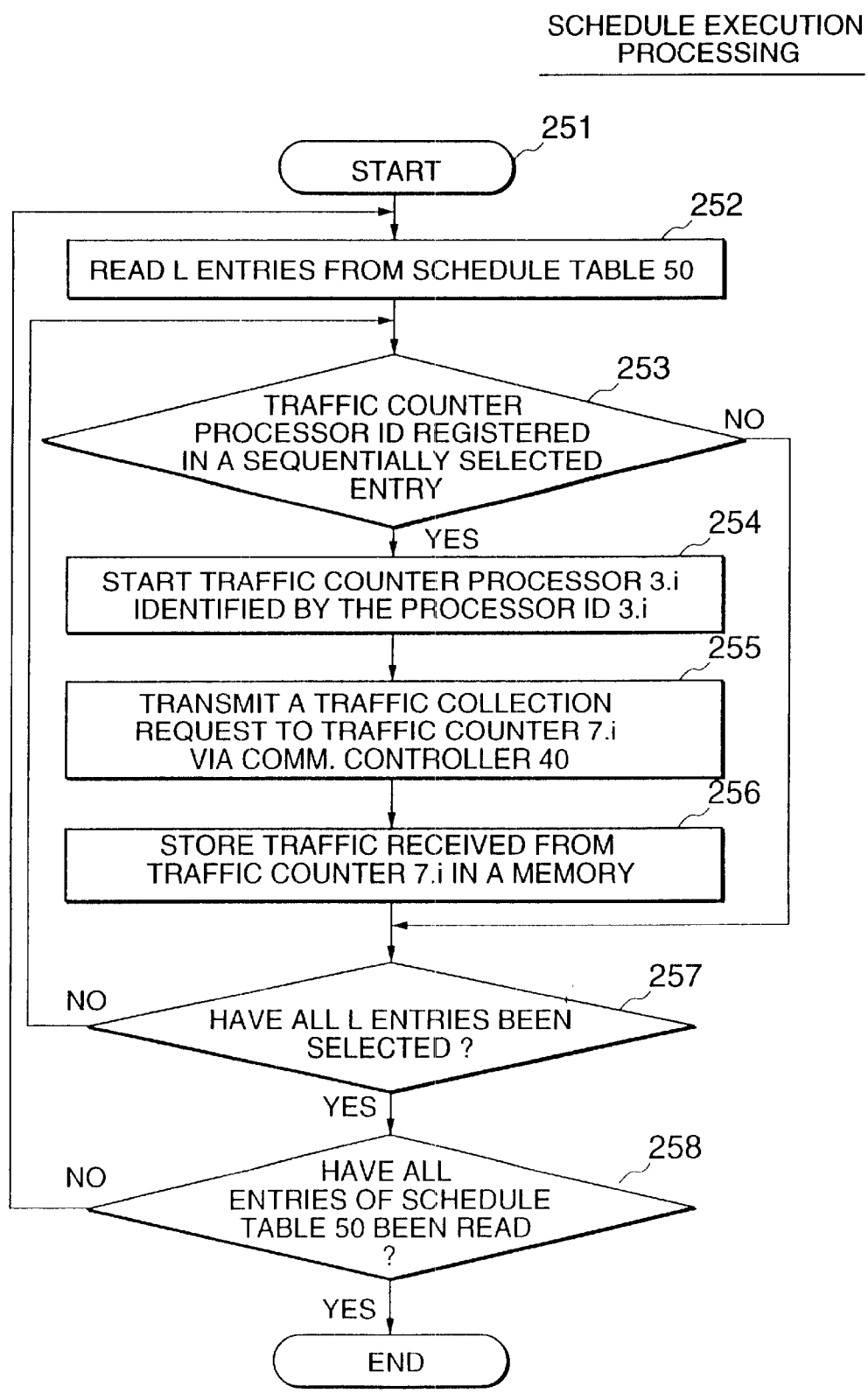
FIG. 4 is a flowchart showing an operation of a schedule execution processor in the embodiment.

Referring to FIG. 3, upon receipt of a collection timing signal T from the collection cycle timer 11, the schedule table creation processor 21 starts the schedule table creation operation (step 211).

The schedule table creation processor 21 calculates the necessary number of entries (N) to be created in the schedule table 50 using the expression: N=M×T, where M (requests/sec) is the maximum permissible number of traffic data collection requests per second that the switching equipment 60 can cope with and T (sec) is a predetermined time period during which the traffic data are received from all the traffic counters 7.1 to 7.n (step 212). The permissible request count M (requests/sec) and the collection cycle T (sec) are both stored as operation parameters in the network management system 90.

Therefore, each entry of the schedule table 50 corresponds a time period of 1/M (sec/request) during which one of the traffic counters 7.1 to 7.n processes the traffic data collection request. In other words, if no traffic data collection request is transmitted to the switching equipment 60 for a time period of 1/M or more, the switching equipment 60 can be avoided from overloaded.

Subsequently, the schedule table creation processor 21 initializes N entries starting with the top entry of the schedule table 50 to enable them (step 213).

Thereafter, the schedule table creation processor 21 calculates an interval L between adjacent entries in the schedule table 50 so that the traffic counter control processors 3.1 to 3.n sequentially start at intervals of L for a traffic data collection period of T (step 214). The interval L is obtained by the expression: L=N/K, where K is the number of traffic counters (here, 7.1–7.n) installed in the switching equipment 60.

The schedule table creation processor 21 then registers a pair of event type and processor ID in the schedule table 50 every L entries until all processor IDs have been registered in the schedule table 50 (steps S215 and 216). In this embodiment, a traffic data collection request and the processor ID of a sequentially designated one of the traffic counter processors 3.1–3.n are registered in the schedule table 50 every L entries as shown in FIG. 2.

Assuming that 720 traffic counters 7.1 to 7.720 are installed in the switching equipment 60 (K=720), the permissible request count M=1 request/sec, and the collection cycle T=3600 seconds, 3600 entries are created in the schedule table 50 because N=M×T=1×3600=3600, and a pair of event type (Traffic) and a sequentially designated processor ID from 3.1, 3.2, 3.3, . . . , and 3.720 is registered every 5 entries in the schedule table 50 because L=N/K= 3600/720=5. As shown in FIG. 2, the event type of Traffic and the processor ID 3.1 are registered in the event type field and processor ID field of the first entry (serial number=1), respectively, and the event type of Traffic and the processor ID 3.2 are registered in the event type field and processor ID field of the sixth entry (serial number=6), respectively. Similarly, the event type of Traffic and the processor ID 3.720 are registered in the event type field and processor ID field of the 3596-th entry (serial number=3596), respectively.

SCHEDULE EXECUTION

As described before, the schedule execution processor 22 is activated according to the schedule execution timing signal S received from the schedule execution cycle timer 12. The time interval S of the schedule execution timing signal is usually set depending on the entry interval L, for example, S=L/M.

When the schedule execution processor 22 is activated according to the schedule execution timing signal S (step 251), the schedule execution processor 22 sequentially reads a set of L entries from the schedule table 50 (step 252) and determines whether a traffic counter processor ID is registered in a sequentially selected entry of the read L entries (step 253).

When a traffic counter processor ID (3.i) is registered in the selected entry of the read L entries (YES at step 253), the schedule execution processor 22 starts the traffic counter processor 3.i identified by the processor ID (3.i) depending on the event type (step 254). In this embodiment, since the event type is traffic data collection, when the processor ID 3.1 is registered in the selected entry, the schedule execution processor 22 starts the traffic counter processor 3.1 to perform traffic data collection.

Thereafter, the schedule execution processor 22 instructs the traffic counter control processor 3.i to transmit a traffic data collection request to the corresponding traffic counter 7.i via the communication controller 40 (step 255). Upon receipt of the traffic data as a response from the traffic counter 7.i, the traffic counter processor 3.i stores the received traffic data for the traffic counter 7.i in a memory (not shown) (step 256).

After the step 256 or when no processor ID is registered in the selected entry of the read L entries (NO at step 253), it is determined whether all the read L entries have been selected (step 257). If not (NO at step 257), the control goes back to the step 253 to select a subsequent entry from the read L entries and the steps 253–256 are repeatedly performed until all the read L entries have been selected.

When all the read L entries have been selected (YES at step 257), it is determined whether all the entries of the schedule table 50 have been read (step 258). If not (NO at step 258), the schedule execution processor 22 reads a subsequent set of L entries from the schedule table 50 (step 252). The steps 252–257 are repeatedly performed until all the entries of the schedule table 50 have been read.

In the case of the entry interval L=5, the schedule execution processor 22 sequentially reads a set of 5 entries from the schedule table 50. The time interval S of the schedule execution timing signal is set to 5 seconds because S=L/M=5/1=5. Therefore, a traffic data collection request is transmitted one in every 5 seconds from the network management system 90 to the switching equipment 60.

As shown in FIG. 2, the schedule table 50 has empty entries having no data stored therein. Such an empty entry can be used for interrupt processing other than the traffic data collection such as a setting change of the switching equipment. For example, in the case where the status of each line port of the switching equipment 60 is displayed on a monitor of the network management system 90, an interrupt command is input through the terminal of the network management system 90 and the event type and processor ID corresponding to the command is stored in an empty entry after a currently read entry. When the entry storing the event type and processor ID corresponding to the command is read from the schedule table 50, the processing of the command starts.

Further, the traffic data collection cycle T is supplied from the collection cycle timer 11 to the schedule table creation processor 21. Therefore, the traffic data collection cycle T can be easily changed by controlling the collection cycle timer 11 from the network management system 90.

Therefore, when the system starts, the schedule table creation processor 21 creates the schedule table 50 at traffic data collection timing, and then the schedule execution processor 22 executes the schedule of events including interrupt processing. When the schedule execution processor 22 has processed all the entries of the schedule table 50, the interrupt event is deleted before processing the original entries of the schedule table 50 starting with the first entry.

What is claimed is:

1. A network management system having a function of collecting traffic data at predetermined intervals from a switch having a plurality of traffic detectors provided for respective ones of line ports of the switch, comprising:
   a schedule table having a plurality of entries, in which traffic data collection events for respective ones of the traffic detectors are stored; and
   a traffic data collection processor for sequentially accessing the plurality of entries of the schedule table to transmit traffic data collection requests to the traffic detectors.

2. The network management system according to claim 1, wherein the entries in the schedule table are associated with lapses of time in sequence, respectively.

3. The network management system according to claim 1, wherein a number N of the entries in the schedule table is determined by multiplying M by T, where M is a maximum permissible number of traffic data collection requests that the switch can cope with per unit of time, and T is a second predetermined interval.

4. The network management system according to claim 3, wherein a first predetermined interval L is determined by dividing N by K, where K is a number of the traffic detectors provided in the switch.

5. The network management system according to claim 1, wherein the traffic data collection events are registered in equally spaced entries in the schedule table.

6. The network management system according to claim 5, wherein at least one interrupt event other than the traffic data collection events is registered in an available entry other than the equally spaced entries in the schedule table.

7. The network management system according to claim 6, wherein the scheduler deletes said at least one interrupt event from the schedule table when all the entries of the schedule table have been accessed.

8. The network management system according to claim 5, wherein each of the equally spaced entries in the schedule table stores an event type of traffic data collection and an identification identifying a corresponding traffic detector.

9. A method for collecting traffic data at predetermined intervals from a switch having a plurality of traffic detectors provided for respective ones of line ports of the switch, comprising the steps of:
   sequentially accessing a plurality of entries of a schedule table, in which traffic data collection events for respective ones of the traffic detectors are stored; and
   when a traffic data collection event is registered in an accessed entry, transmitting a traffic data collection request to a corresponding traffic detector.

10. The method according to claim 9, wherein the entries in the schedule table are associated with lapses of time in sequence, respectively.

11. The method according to claim 9, wherein a number N of the entries in the schedule table is determined by multiplying M by T, where H is a maximum permissible number of traffic data collection requests that the switch can cope with per unit of time, and T is a second predetermined interval.

12. The method according to claim 11, wherein a first predetermined interval L is determined by dividing N by K, where K is a number of the traffic detectors provided in the switch.

13. The method according to claim 9, wherein the traffic data collection events are registered in equally spaced entries in the schedule table.

14. The method according to claim 13, further comprising the step of:
   registering at least one interrupt event other than the traffic data collection events in an available entry other than the equally spaced entries in the schedule table.

15. The method according to claim 14, further comprising the step of:
   deleting said at least one interrupt event from the schedule table when all the entries of the schedule table have been accessed.

16. A network management system having a function of periodically collecting traffic data at predetermined intervals from a switch having a plurality of traffic counters provided for respective ones of line ports of the switch, comprising:
   traffic counter processors provided for respective ones of the traffic counters, each of the traffic counter processors transmits a traffic data collection request to a designated one of the traffic counters and stores traffic data received from the designated traffic counter;
   a schedule table for scheduling operations of the traffic counter processors;
   a schedule table creation processor for providing a schedule time interval to each of the entries of the schedule table and assigning processor identifications of the traffic counter processors to entries equally spaced in the schedule table;

a collection cycle timer for activating schedule table creation processing of the schedule table creation processor in a predetermined period of time;

a schedule execution processor for activating the traffic counter processors depending on the processor identifications registered in the schedule table; and a schedule execution timer for activating the schedule execution processor in a predetermined period of time, wherein traffic counter collection requests are transmitted to the switch uniformly for a predetermined time period.

17. The system of claim 1, wherein the plurality of entries in the schedule table are distributed at first predetermined intervals.

18. The system of claim 2, further comprising a scheduler for creating the schedule table at second predetermined intervals.

19. The system of claim 1, wherein said traffic data collection processor transmits data collection requests depending on whether a traffic data collection event is registered in an accessed entry.

20. The method of claim 9, wherein said traffic data collection events are distributed at first predetermined intervals.

21. The method of claim 20, further comprising creating the schedule table at second predetermined intervals.

* * * * *